(12) United States Patent
Jung et al.

(10) Patent No.: US 11,692,665 B2
(45) Date of Patent: Jul. 4, 2023

(54) DISPLAY APPARATUS AND ASSEMBLY METHOD THEREOF

(71) Applicant: SAMSUNG ELECTRONICS CO., LTD., Suwon-si (KR)

(72) Inventors: Heungsung Jung, Suwon-si (KR); Honggyun Kim, Suwon-si (KR); Byungnam Lee, Suwon-si (KR); Yonghwan Park, Suwon-si (KR); Dongjin Lee, Suwon-si (KR); Bongsup Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/132,197

(22) Filed: Dec. 23, 2020

(65) Prior Publication Data

US 2021/0199233 A1    Jul. 1, 2021

Related U.S. Application Data

(60) Provisional application No. 62/955,151, filed on Dec. 30, 2019.

(30) Foreign Application Priority Data

Feb. 3, 2020 (KR) .................. 10-2020-0012634

(51) Int. Cl.
*F16M 11/04* (2006.01)
*F16M 11/22* (2006.01)

(52) U.S. Cl.
CPC ............. *F16M 11/04* (2013.01); *F16M 11/22* (2013.01); *B65D 2585/6837* (2013.01); *F16M 2200/021* (2013.01); *F16M 2200/08* (2013.01)

(58) Field of Classification Search
CPC .......... B65D 85/68; B65D 5/32; B65D 77/26; B65D 81/113; B65D 2585/6837;
(Continued)

(56) References Cited

U.S. PATENT DOCUMENTS 7,588,148 B2 *  9/2009  Yang ..................... B65D 5/509
                                                    206/592
7,690,508 B2 *  4/2010  Maruta ................. B65D 77/02
                                                    206/521

(Continued)

FOREIGN PATENT DOCUMENTS

CN    1725384 A      1/2006
EP    2 361 838 A1   8/2011
(Continued)

OTHER PUBLICATIONS

International Search Report dated Apr. 5, 2021, in corresponding International Patent Application No. PCT/KR2020/018771.
(Continued)

*Primary Examiner* — Christopher Garft
(74) *Attorney, Agent, or Firm* — Staas & Halsey LLP

(57) ABSTRACT

Disclosed is a display apparatus including a display including a stand mounting part, a stand to which the stand mounting part is coupleable to mount the display on the stand, and a protection member comprising a portion that includes a support protection member and is detachably coupleable along an edge of the display so that, when the portion is coupled along the edge of the display, the support protection member covers a lower end portion of the display, and a mounting part protection member that is detachably coupleable along the edge of the display so that, when the mounting part protection member is coupled along the edge of the display, the mounting part protection member covers a portion of the display along which the stand is mountable, wherein the mounting part protection member is separately
(Continued)

detachable from along the edge of the display while the portion that includes the support protection member remains coupled along the edge of the display with the support protection member covering the lower end portion of the display, to thereby uncover the portion of the display along which the stand is mountable.

3 Claims, 13 Drawing Sheets

(58) Field of Classification Search
CPC .. F16M 11/04; F16M 11/22; F16M 2200/021; F16M 2200/08
USPC ........................................ 206/320, 453, 576
See application file for complete search history.

(56) References Cited

U.S. PATENT DOCUMENTS

| | | | |
|---|---|---|---|
| 2005/0050784 A1* | 3/2005 | Bang | F16M 11/22 40/607.01 |
| 2008/0067096 A1* | 3/2008 | Maruta | B65D 77/02 206/521 |
| 2008/0239645 A1 | 10/2008 | Li | |
| 2011/0210024 A1 | 9/2011 | Tanaka et al. | |
| 2013/0100359 A1* | 4/2013 | Yokawa | B65D 5/5069 206/320 |

FOREIGN PATENT DOCUMENTS

| | | | | |
|---|---|---|---|---|
| EP | 2 586 725 A1 | | 5/2013 | |
| JP | 2006-160335 | | 6/2006 | |
| JP | 2007-178502 A | | 7/2007 | |
| JP | 2009-255940 A | | 11/2009 | |
| JP | 2013-126887 | * | 6/2013 | ............ B65D 85/68 |
| JP | 2013-126887 A | | 6/2013 | |
| KR | 10-0224302 B1 | | 10/1999 | |
| KR | 20-0214798 Y1 | | 3/2001 | |
| KR | 10-0522957 B1 | | 10/2005 | |
| KR | 10-2005-0117211 A | | 12/2005 | |
| KR | 10-2005-0117212 A | | 12/2005 | |
| KR | 10-0692547 B1 | | 3/2007 | |
| KR | 10-0800198 B1 | | 2/2008 | |
| KR | 10-2009-0075389 A | | 7/2009 | |

OTHER PUBLICATIONS

Extended European Search Report dated Apr. 30, 2021, in corresponding European Patent Application No. 20216763.1.
Office Action dated Apr. 24, 2022, issued in Chinese Application No. 202011609521.9.
Office Action dated Oct. 17, 2022, in Chinese Application No. 202011609521.9.
European Search Report dated Sep. 9, 2022, in European Application No. 20 216 763.1.
Office Action dated Jan. 18, 2023, in Chinese Application No. 202011609521.9.

* cited by examiner

DISPLAY APPARATUS AND ASSEMBLY METHOD THEREOF

CROSS-REFERENCE TO RELATED APPLICATION(S)

This application is based on and claims priority under 35 U.S.C. § 119 to U.S. Patent Provisional Application No. 62/955,151, filed on Dec. 30, 2019, in the US Intellectual Property Office, and Korean Patent Application No. 10-2020-0012634, filed on Feb. 3, 2020, in the Korean Intellectual Property Office, the disclosures of which are incorporated by reference herein in their entireties.

BACKGROUND

1. Field

The disclosure relates to a display apparatus and an assembly method thereof, and more particularly, to a display apparatus including a stand and an assembly method thereof.

2. Description of the Related Art

Recently, displays that display contents in display apparatuses have become high-resolution and large. Also, displays are getting thinner in thickness and lighter in weight. Display apparatuses may be classified into a wall-mounted display apparatus fixed to a wall and a stand type display apparatus erected on a floor.

A stand type display apparatus may include a stand that supports a display so that the display may be erected on a floor. Generally, the stand is mounted on a lower portion of the display and may include a portion extending along the front-rear direction of the display.

Conventionally, when a stand is mounted on a display, the display is laid with a front side facing a floor, the stand is mounted, and the display mounted with the stand is moved so that the display is placed in a desired position by a user.

SUMMARY

It is an aspect of the disclosure to provide a method of assembling a display apparatus capable of preventing damage to a display by reducing an external force applied to the display when a stand is mounted on the display.

It is another aspect of the disclosure to provide a display apparatus capable of preventing a display mounted on a stand from being overturned.

Additional aspects of the disclosure will be set forth in part in the description which follows and, in part, will be obvious from the description, or may be learned by practice of the disclosure.

In accordance with an aspect of the disclosure, a display apparatus includes a display including a stand mounting part, a stand to which the stand mounting part is coupleable to mount the display on the stand, and a protection member comprising a portion that includes a support protection member and is detachably coupleable along an edge of the display so that, when the portion is coupled along the edge of the display, the support protection member covers a lower end portion of the display, and a mounting part protection member that is detachably coupleable along the edge of the display so that, when the mounting part protection member is coupled along the edge of the display, the mounting part protection member covers a portion of the display along which the stand is mountable, wherein the mounting part protection member is separately detachable from along the edge of the display while the portion that includes the support protection member remains coupled along the edge of the display with the support protection member covering the lower end portion of the display, to thereby uncover the portion of the display along which the stand is mountable.

When the mounting part protection member is detached from along the edge of the display while the portion that includes the support protection member remains coupled along the edge of the display with the support protection member covering the lower end portion of the display, the support protection member may support the display to prevent the display from being overturned.

The support protection member may include first and second support protection members disposed on opposite sides of the mounting part protection member, respectively.

The protection member and the stand may be configured so that the stand is accommodatable in the protection member.

The protection member may further include a cover protection member that is separate from the portion that includes the support protection member and from the mounting part protection member, and that is detachably coupleable along the edge of the display at an upper end portion of the display, the stand may include a first part and a second part, the cover protection member and the first part of the stand may be configured so that the first part of the stand is accommodateable in the cover protection member, and the support protection member and the second part of the stand may be configured so that the second part of the stand is accommodateable in the support protection member.

In accordance with another aspect of the disclosure, a display apparatus includes a display including a stand mounting part on a rear surface of the display, and a stand to which the stand mounting part is coupleable to mount the display on the stand, wherein the stand includes a locking part and a separation preventing part configured so that, when the stand mounting part is coupled to the stand to mount the display on the stand, the locking part prevents the display from being separated from the stand, and prevents the display from being rotated, with respect to the stand, in one of a forward direction and a backward direction, and the separation preventing part prevents the display from being rotated, with respect to the stand, in the other of the forward direction and the backward direction, and prevents the display from being separated from the stand.

The separation preventing part may be positioned below the locking part.

The separation preventing part may be configured to support a weight of the display.

The separation preventing part may include a restricting protrusion extending toward the locking part to prevent the display from being rotated, with respect to the stand, in the other of the forward direction and the backward direction, and the locking part may include a locking protrusion extending toward the separation preventing part to prevent the display from being rotated, with respect to the stand, in the one of the forward direction and the backward direction.

The stand mounting part may include a first mounting portion on which the separation preventing part is coupleable to couple the stand mounting part to the stand, and a second mounting portion on which the locking part is coupleable to couple the stand mounting part to the stand, and a distance between the first mounting portion and the second mounting portion may be greater than a distance between the restricting protrusion and the locking protrusion.

The display apparatus may further include a fastening member configured to fix the stand to the display.

The stand mounting part may be provided at a lower end portion of the rear surface of the display, and the display may be disposed to be inclined so that a front surface of the display faces upward by a predetermined angle when the display is mounted on the stand.

In accordance with another aspect of the disclosure, a method of assembling a display apparatus that includes a display having a stand mounting part which is coupleable to a stand to mount the display on the stand, and a protection member having a portion that includes a support protection member and is detachably coupled along an edge of the display with the support protection member covering a lower end portion of the display, and a mounting part protection member that is detachably coupled along the edge of the display and covering a portion of the display along which the stand is mountable, the method includes detaching the mounting part protection member from along the edge of the display while the portion that includes the support protection member remains coupled along the edge of the display with the support protection member covering the lower end portion of the display, to uncover the portion of the display along which the stand is mountable, after detaching the mounting part protection member, coupling the stand mounting part to the stand to mount the display on the stand, and after coupling the stand mounting part to the stand to mount the display on the stand, detaching the portion that includes the support protection member from along the edge of the display.

The protection member includes a cover protection member that is separate from the portion that includes the support protection member and from the mounting part protection member, and that is detachably coupled along the edge of the display at an upper end portion of the display, and the method may further include detaching the cover protection member from along the edge of the display before detaching the mounting part protection member.

The stand is accommodated in the protection member, and the method may further include separating the stand from the protection member before coupling the stand mounting part to the stand to mount the display on the stand.

The stand includes a first part and a second part, the first part of the stand is accommodated in the cover protection member, and the second part of the stand is accommodated in the support protection member, the method may include separating the first part of the stand from the cover protection member, and separating the second part of the stand from the support protection member.

The method may further include providing the stand by combining the first part and the second part after detaching the cover protection member.

The stand may include a separation preventing part and a locking part positioned above the separation preventing part and having a locking protrusion extending toward the separation preventing part, and the method may further include, when coupling the stand mounting part to the stand, inserting the locking protrusion into the stand mounting part of the display, rotating the stand with the locking protrusion inserted into the stand mounting part, and then coupling the separation preventing part to the stand mounting part.

The method may further include fixing the stand to the display through a fastening member after mounting the display on the stand.

The method may further include mounting a stand cover on the stand to cover the fastening member after fixing the stand to the display.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
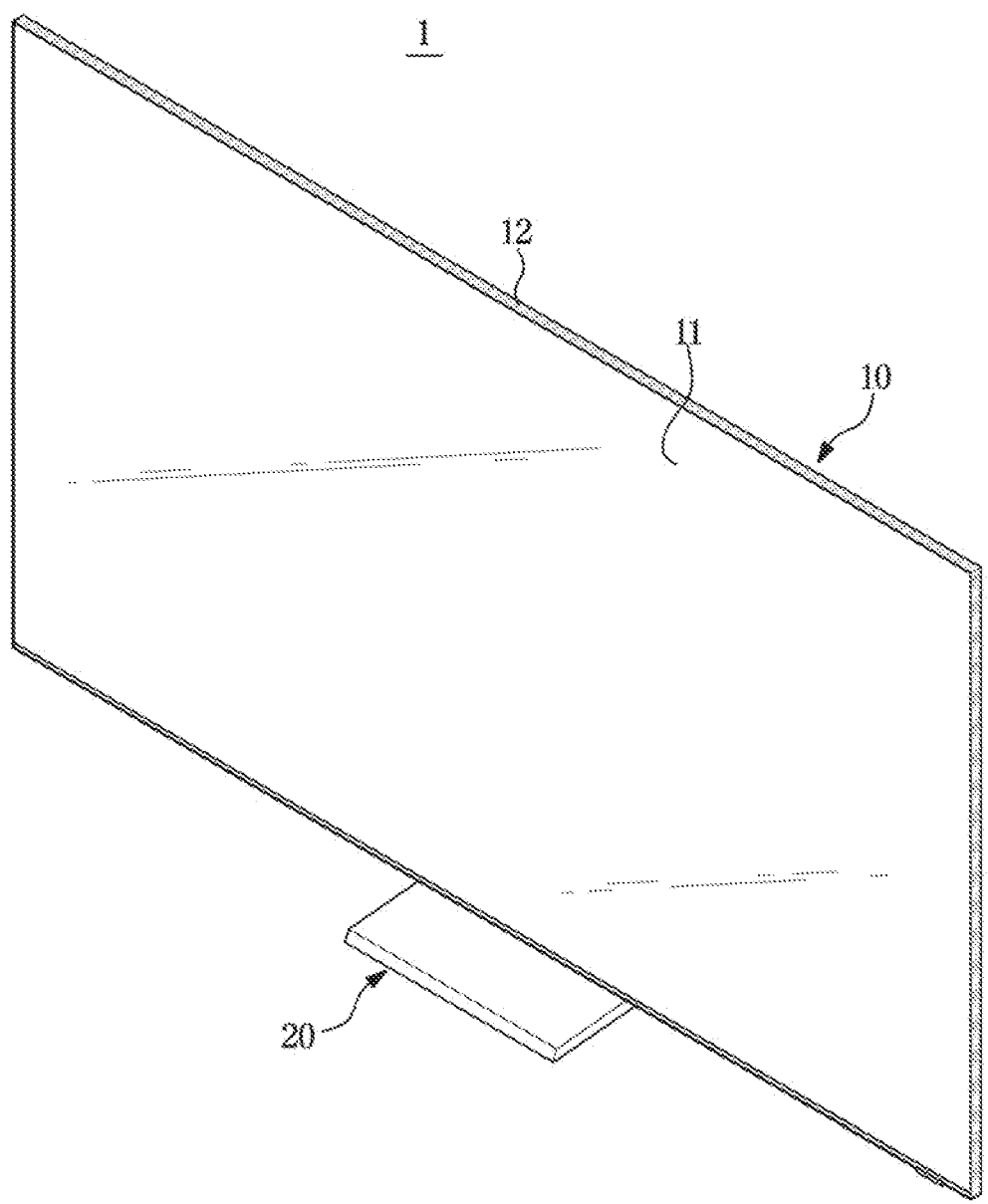
FIG. 1 illustrates a display apparatus according to an embodiment of the disclosure.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof. Content may be displayed in a display apparatus. For example, the content may include a video file or an audio file played by a video player, which is one of applications, a music file played by a music player, a photo file displayed in a photo gallery, a web page file displayed by a web browser, and the like. The content may also include broadcasts received.

The content may include a video file, an audio file, a text file, an image file, or a web page to be displayed or executed in an application. The content may also include a video file and/or audio file included in a received broadcast signal.

The content may include an application screen to be executed and a user interface constituting the application screen. The content may also include a single content or a plurality of contents.

An application refers to software running on a desk-top Operating system (OS), a mobile OS, or a display apparatus OS to be used by a user. For example, the application may include a word processor, a spreadsheet, a contacts application, a calendar application, a memo application, an alarm application, a social network system (SNS) application, a chatting application, a map application, a music player, or a video player. An application according to an embodiment of the present disclosure may mean software executable in a display apparatus in response to an input received from the user. An application according to an embodiment of the present disclosure may be software downloaded from outside of the display apparatus and executed in in the display apparatus.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front end," "rear end," "upper portion," "lower portion," "upper end" and "lower end" used in the following description are defined with reference to the drawings, and the shape and position of each component are not limited by these terms.

Hereinafter, embodiments of the disclosure will be described in detail with reference to the accompanying drawings.

Figure 2:
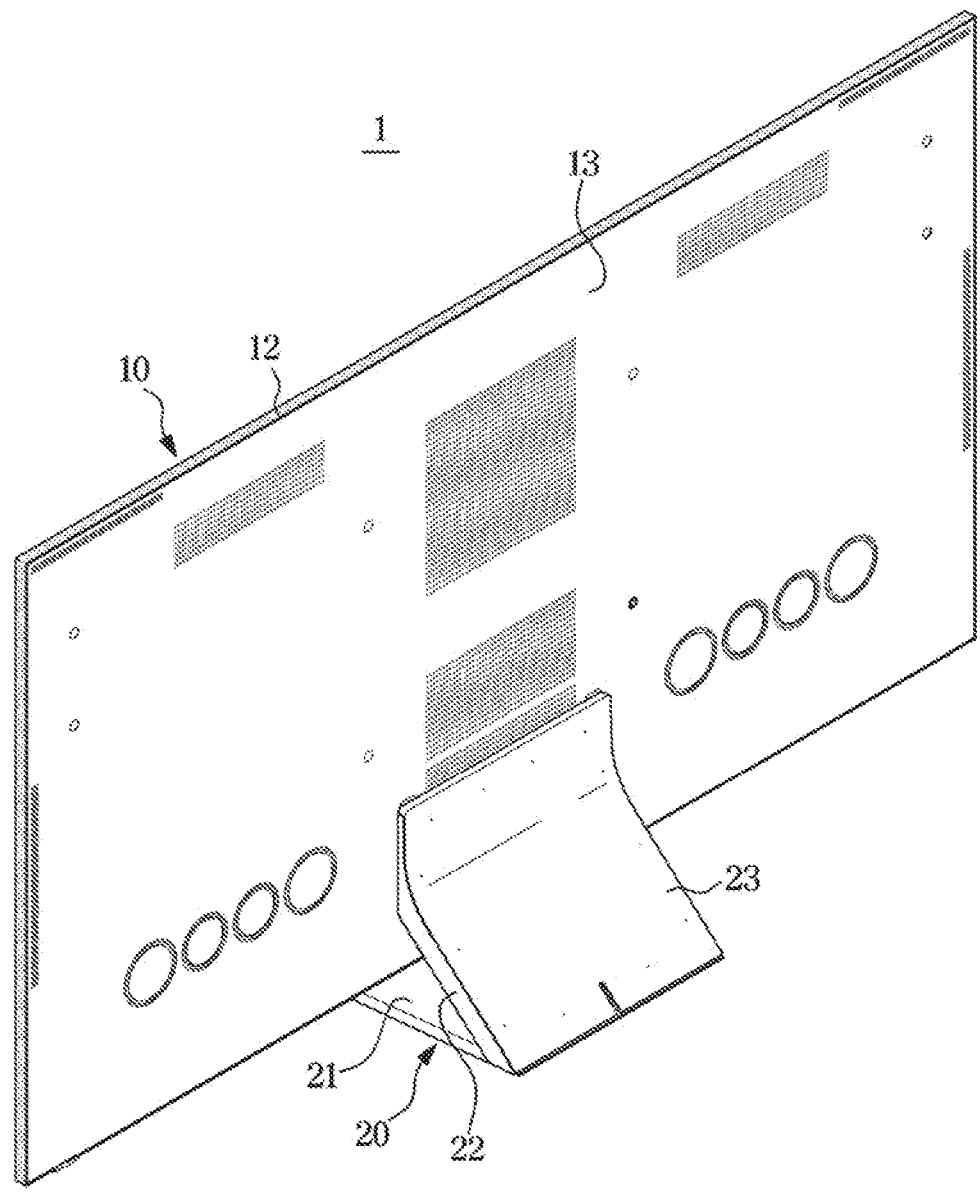
FIG. 2 illustrates the rear of the display apparatus shown in FIG. 1.

FIG. 1 illustrates a display apparatus according to an embodiment of the disclosure, and FIG. 2 illustrates the rear of the display apparatus shown in FIG. 1.

Referring to FIGS. 1 and 2, the display apparatus 1 may include a display 10 to display content and a stand 20 to support the display 10. It will be readily understood by those of ordinary skill in the art that components included in the display 10 may be changed in response to the slimming of the display 10.

The display 10 may include a display panel 11 on which content is displayed and may include a side frame 12 to support at least a portion of a side of the display panel 11. The display 10 is one of output devices that visually and/or audibly output content, and the display panel 11 may include a liquid crystal panel, an LED panel, or a glass LED panel.

The stand 20 may be detachably coupled to a lower end portion of the display 10. The stand 20 may support the display 10 so that the display 10 may be erected on a floor. That is, the stand 20 may support the display 10 so that the display 10 is not overturned when the display 10 is disposed on the floor.

Figure 3:
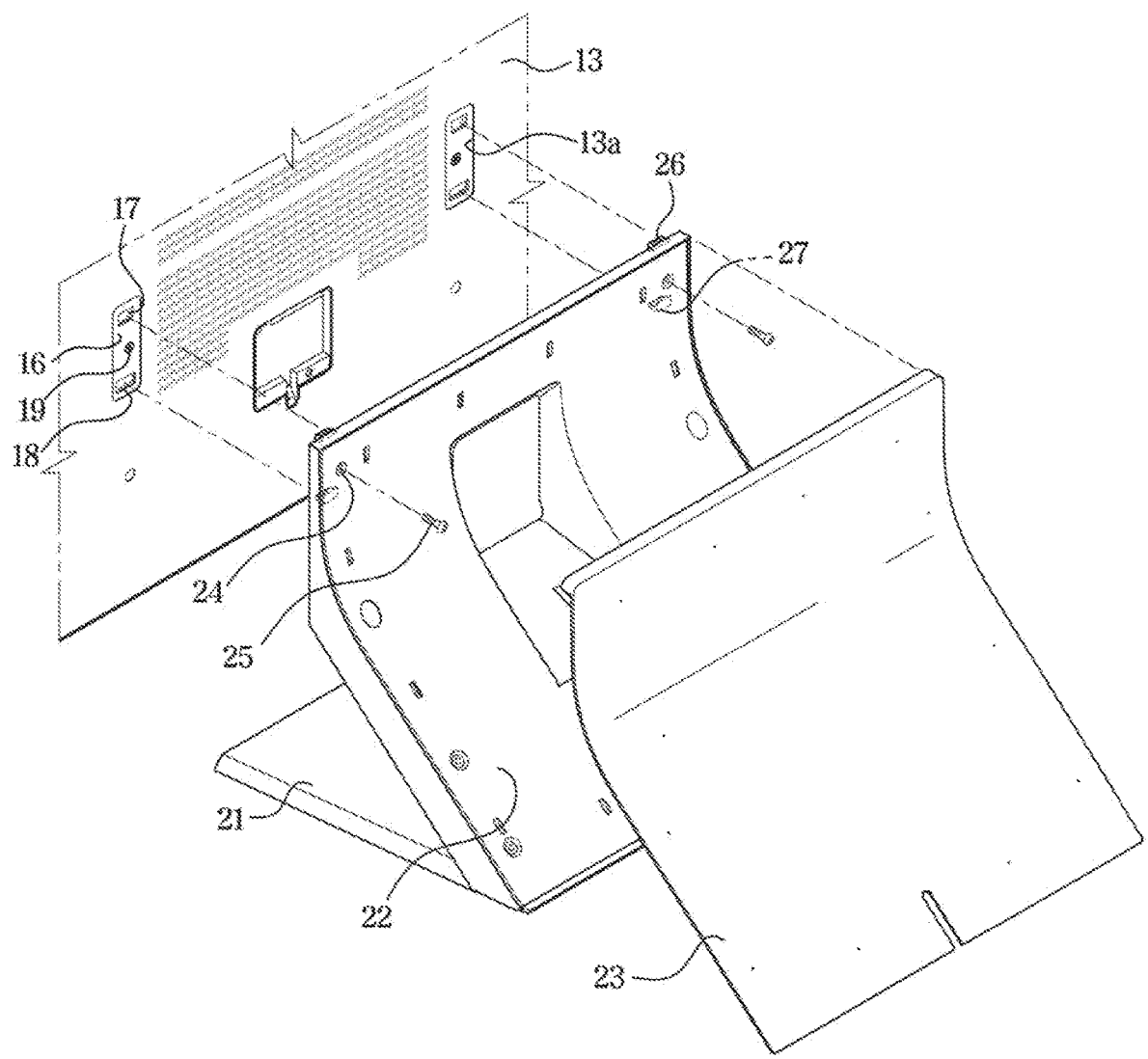
FIG. 3 illustrates that a stand is coupled to a stand mounting part of a display shown in FIG. 2.
Figure 4:
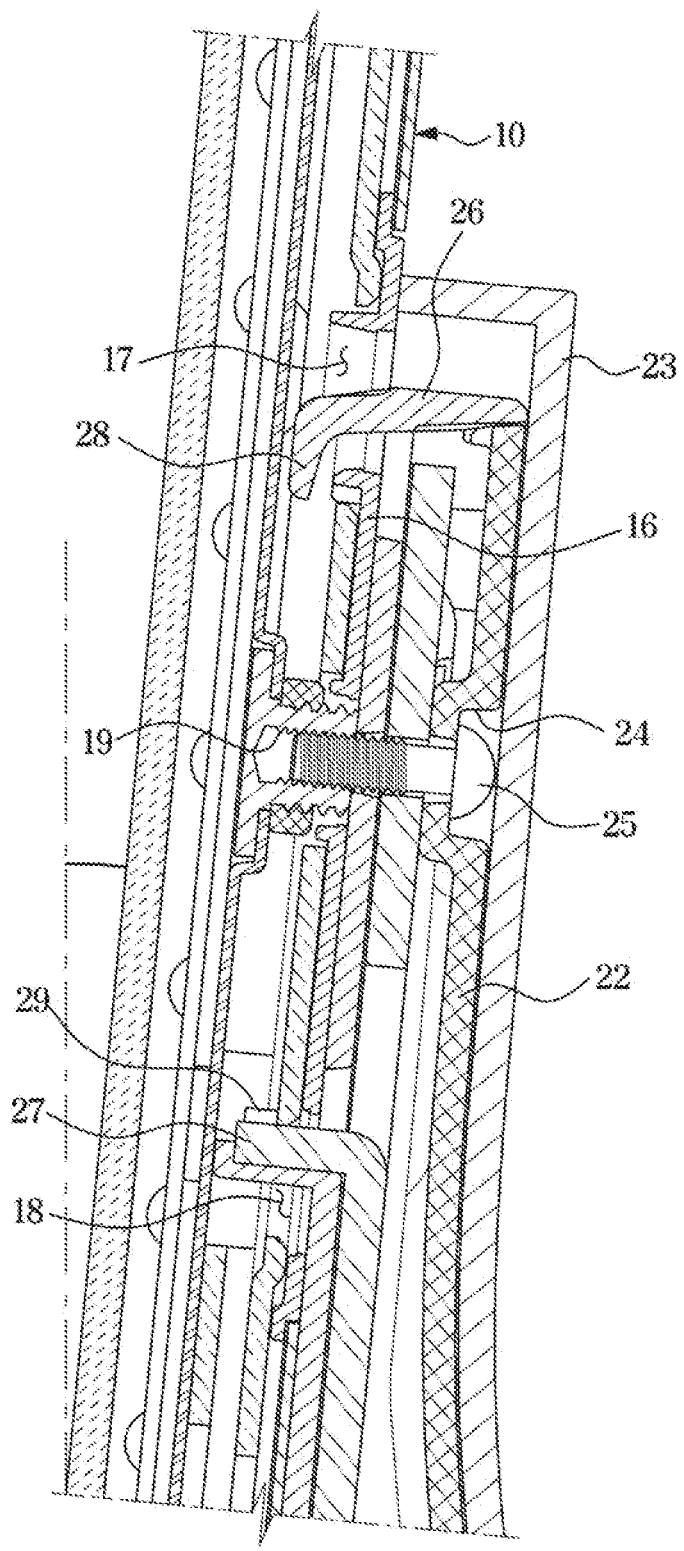
FIG. 4 is a cross-sectional view of the stand coupled to the display shown in FIG. 2.

FIG. 3 illustrates that a stand is coupled to a stand mounting part of a display shown in FIG. 2, and FIG. 4 is a cross-sectional view of the stand coupled to the display shown in FIG. 2.

Referring to FIGS. 3 and 4, the display 10 may include a stand mounting part 16. The stand mounting part 16 may be positioned at the lower end portion of a rear surface of the display 10. Specifically, the display 10 includes a rear cover 13, and the stand mounting part 16 may be exposed to the outside of the display 10 by a cover opening 13a formed on the rear cover 13.

The stand mounting part 16 may include a first mounting portion 17 and a second mounting portion 18. The first mounting portion 17 may be positioned above the second mounting portion 18. The first mounting portion 17 may be coupled to a locking part 26 of the stand 20. The second mounting portion 18 may be coupled to a separation preventing part 27 of the stand 20.

The stand mounting part 16 may include a display fastening portion 19. The display fastening portion 19 may be positioned to correspond to a stand fastening portion 24 of the stand 20. When a fastening member 25 passes through the stand fastening portion 24 and then is coupled to the display fastening portion 19, the display 10 may be fixed to the stand 20.

The stand 20 may include a first part 21 in contact with the floor, and a second part 22 having one end coupled to the first part 21 and the other end fixed to the display 10.

The first part 21 may extend substantially flat.

Referring to FIG. 4, the second part 22 may extend toward a front upper side when coupled to the first part 21. The second part 22 may include the separation preventing part 27 and the locking part 26 to be coupled to the display 10.

The separation preventing part 27 may be positioned below the locking part 26. The separation preventing part 27 may be inserted into the second mounting portion 18 of the stand mounting part 16. The separation preventing part 27 may extend toward the display 10 from the other end of the second part 22.

The separation preventing part 27 may be configured to support a weight of the display 10. Specifically, when the display 10 is held on the stand 20, a portion of the lower end portion of the display 10 may be seated on the separation preventing part 27 and supported by the separation preventing part 27.

The separation preventing part 27 may be formed to prevent the display 10 from being rotated and separated in a first direction when the display 10 is mounted on the stand 20. To this end, the separation preventing part 27 may include a restricting protrusion 29. The restricting protrusion 29 may extend toward the locking part 26. That is, the restricting protrusion 29 may protrude upward from an end of the separation preventing part 27.

Specifically, referring to FIG. 4, when the display 10 is mounted on the stand 20, the display 10 receives a rotational force in a clockwise direction with respect to the stand 20 by the weight thereof. The restricting protrusion 29 may support the display 10 so that the display 10 is not rotated. That is, the restricting protrusion 29 may prevent the lower end portion of the display 10 from being overturned by rotating forward.

The locking part 26 may be positioned above the separation preventing part 27. The locking part 26 may be inserted into the first mounting portion 17 of the stand mounting part 16. The locking part 26 may be formed to prevent the display 10 from being rotated in a second direction opposite to the first direction and being separated from the stand 20 when the display 10 is mounted on the stand 20. To this end, the locking part 26 may include a locking protrusion 28. The locking protrusion 28 may extend toward the separation preventing part 27. That is, the locking protrusion 28 may protrude downward from an end of the locking part 26.

Specifically, referring to FIG. 4, when the display 10 is mounted on the stand 20, the locking part 26 may be configured to restrict the rotation of the display 10 in a direction opposite to the rotation direction of the display 10 of being restricted by the separation preventing part 27. That is, the locking protrusion 28 may support the display 10 so that the display 10 is not rotated counterclockwise. The locking protrusion 28 may prevent an upper end portion of the display 10 from being overturned by rotating forward.

Figure 9:
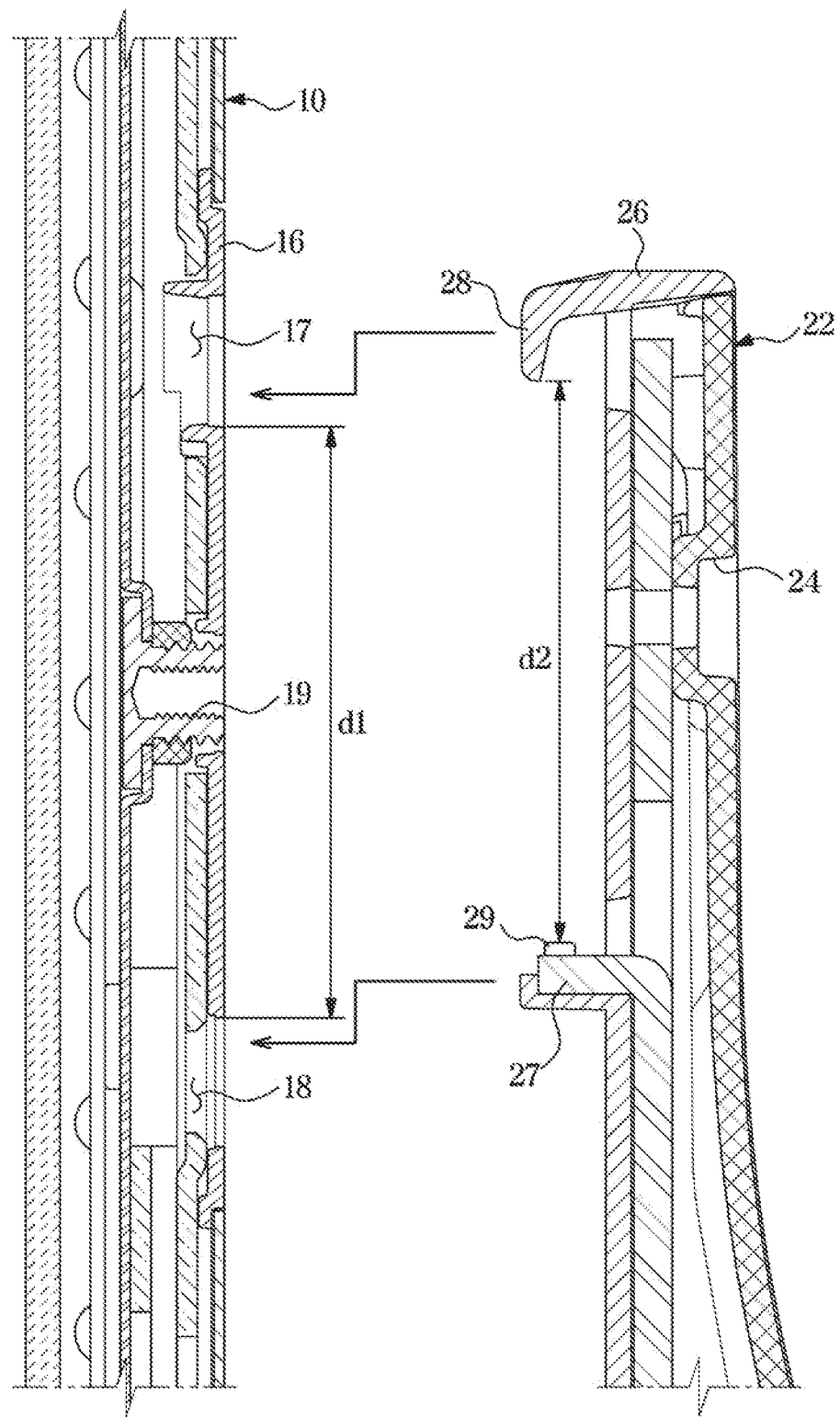
FIGS. 9 and 10 are cross-sectional views illustrating a process in which the stand assembled in FIG. 7 is coupled to the display.

Referring to FIG. 9, a distance d1 between the first mounting portion 17 and the second mounting portion 18 of the stand mounting part 16 may be greater than a distance d2 between the restricting protrusion 29 and the locking protrusion 28 of the stand 20. Accordingly, the display apparatus 1 according to an embodiment of the disclosure may prevent the display 10 from being easily separated from the stand 20 when the display 10 is mounted on the stand 10.

Through this configuration, the stand 20 according to an embodiment of the disclosure may restrict rotation of the display 10 in both directions, and thus may stably support the display 10. In addition, even when the fastening member 25 does not fix the display 10 to the stand 20, the display 10 may maintain a state of being stably held on the stand 20.

The second part 22 may include a stand fastening portion 24 to allow the fastening member 25 for fixing the stand 20 to the display 10 to pass through. The stand fastening portion 24 may be positioned to correspond to the display fastening portion 19 provided on the display 10. As the fastening member 25 passes through the stand fastening portion 24 and the display fastening portion 19 and is coupled to the stand 20 and the display 10, the display 10 may be fixed to the stand 20.

The display apparatus 1 may further include a stand cover 23 coupled to the second part 22. The stand cover 23 may cover a rear surface of the stand 20 so that the stand fastening portion 24 to which the fastening member 25 is fastened is not exposed to the outside.

Referring to FIG. 4, the display 10 may be disposed to be inclined by a predetermined angle with respect to a vertical direction so that a front surface of the display 10 faces upward when the display 10 is coupled to the stand 20. Through this configuration, the display apparatus 1 according to an embodiment of the disclosure may be stably supported by the stand 20 more than when the display 10 is disposed to extend in the vertical direction.

Figure 5:
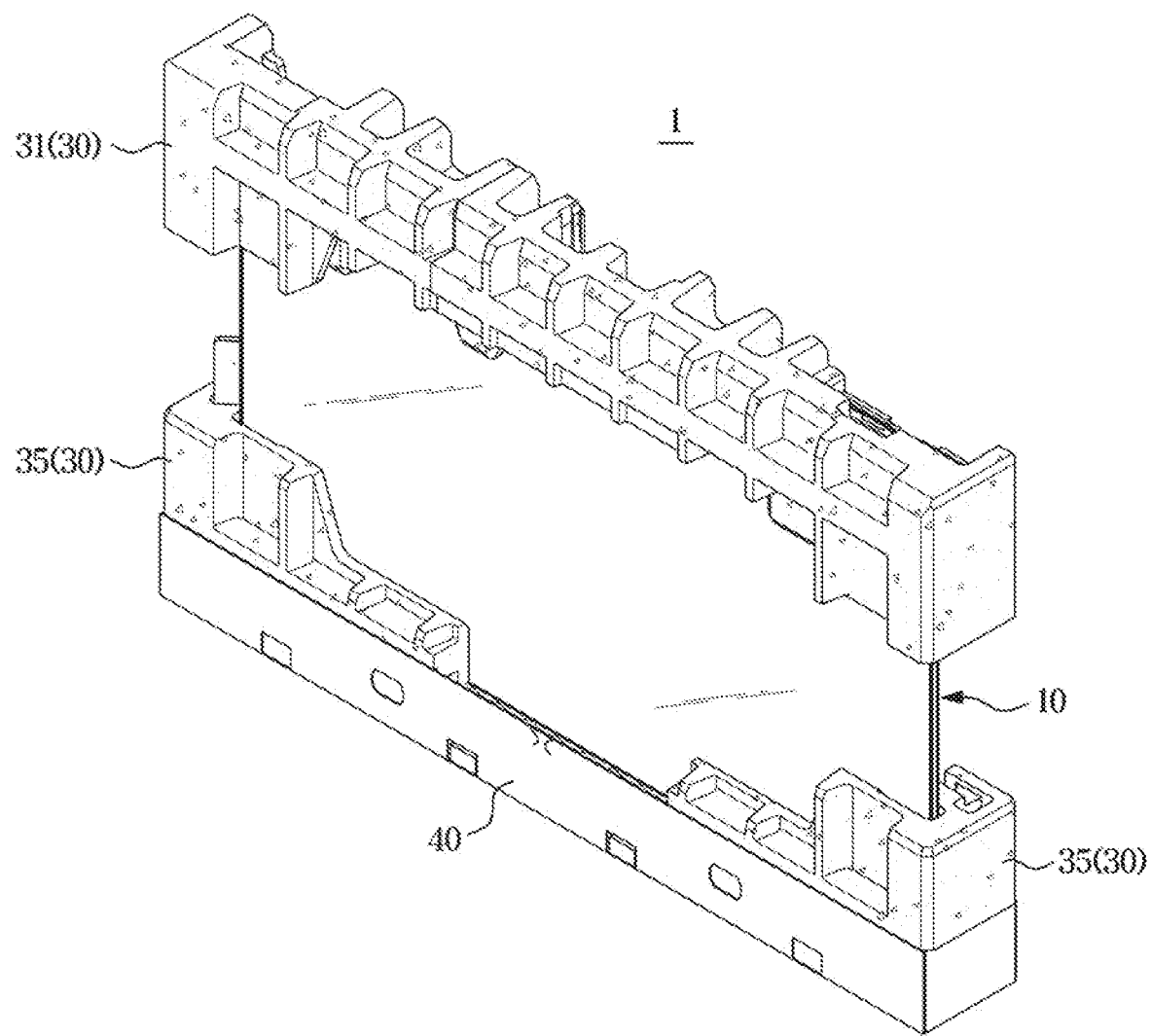
FIG. 5 illustrates that the display and the stand according to an embodiment of he disclosure are covered by a protection member for storage and delivery.
Figure 6:
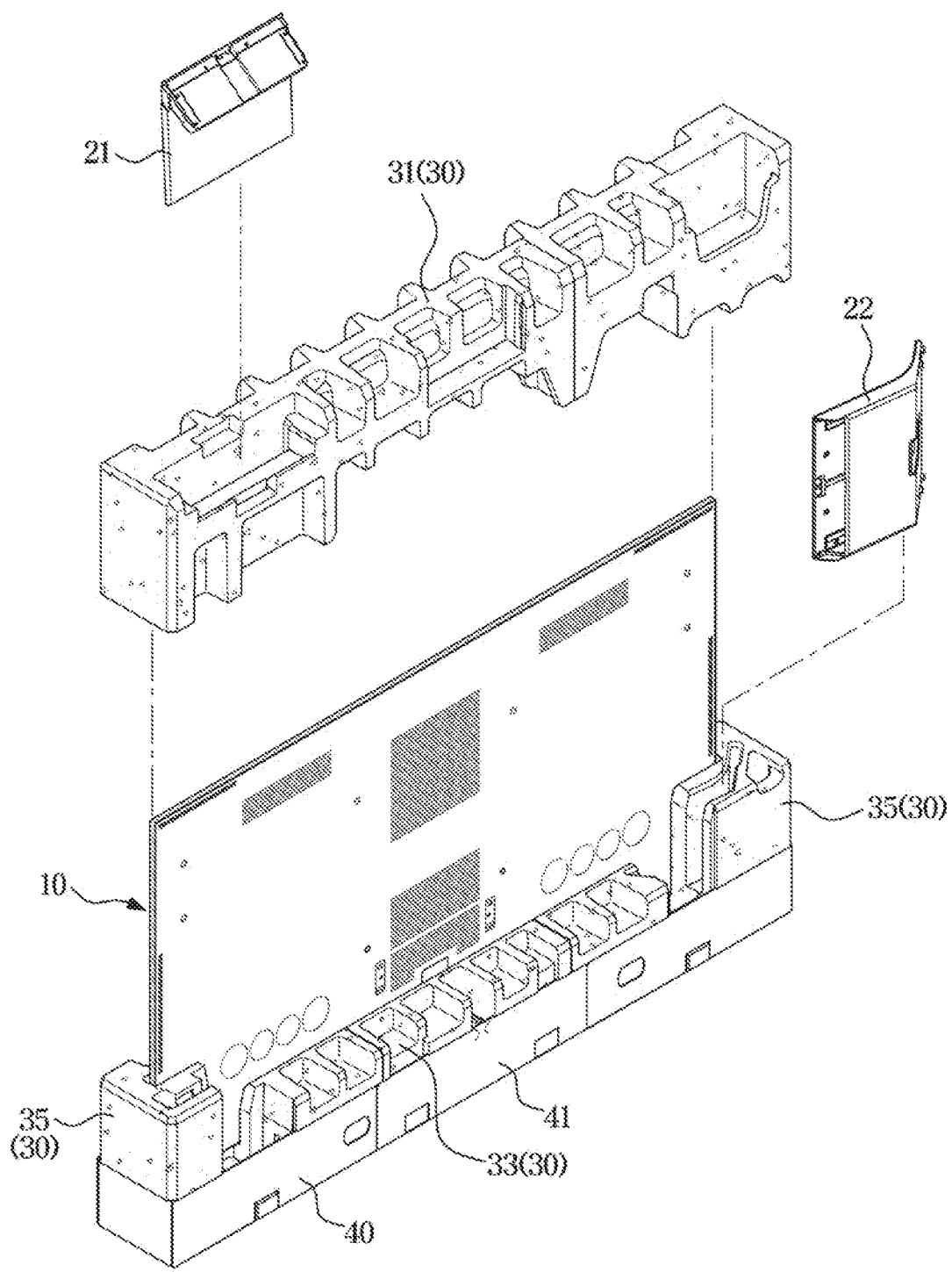
FIG. 6 illustrates that a cover protection member and the stand are separated from the display apparatus shown in FIG. 5.
Figure 7:
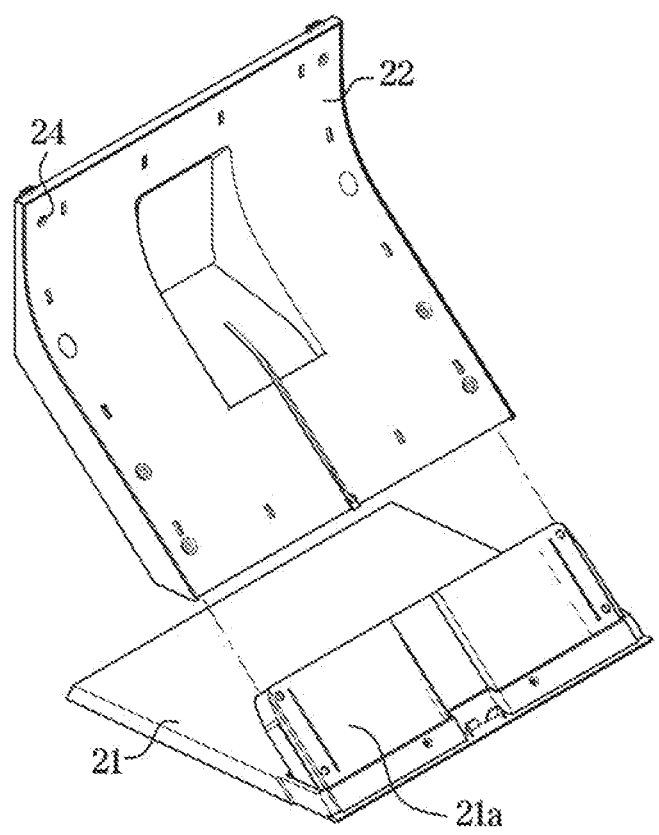
FIG. 7 illustrates that a first part and a second part of the stand shown in FIG. 6 are assembled.
Figure 8:
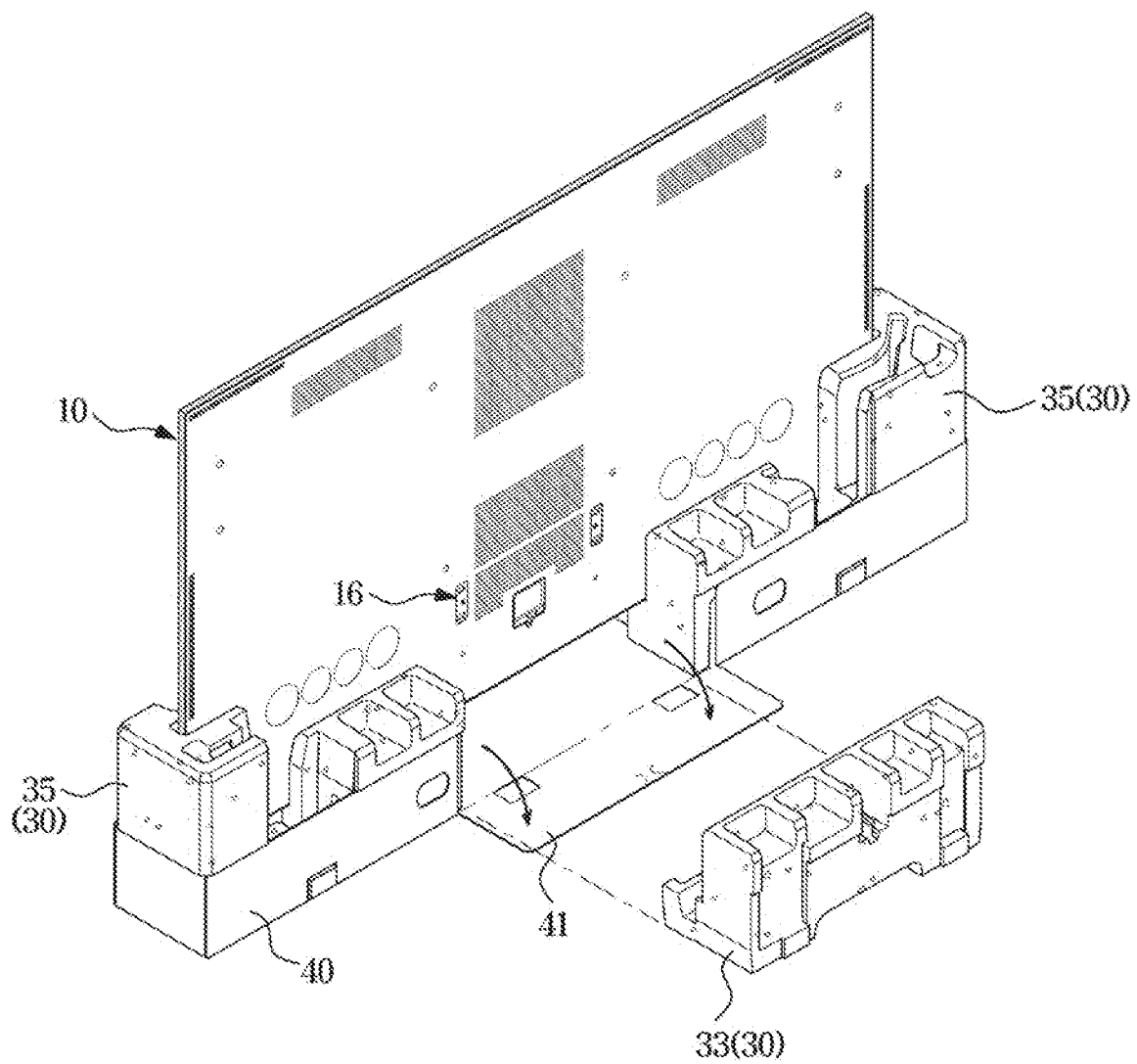
FIG. 8 illustrates that a mounting part protection member is separated from the display apparatus shown in FIG. 6.
Figure 10:
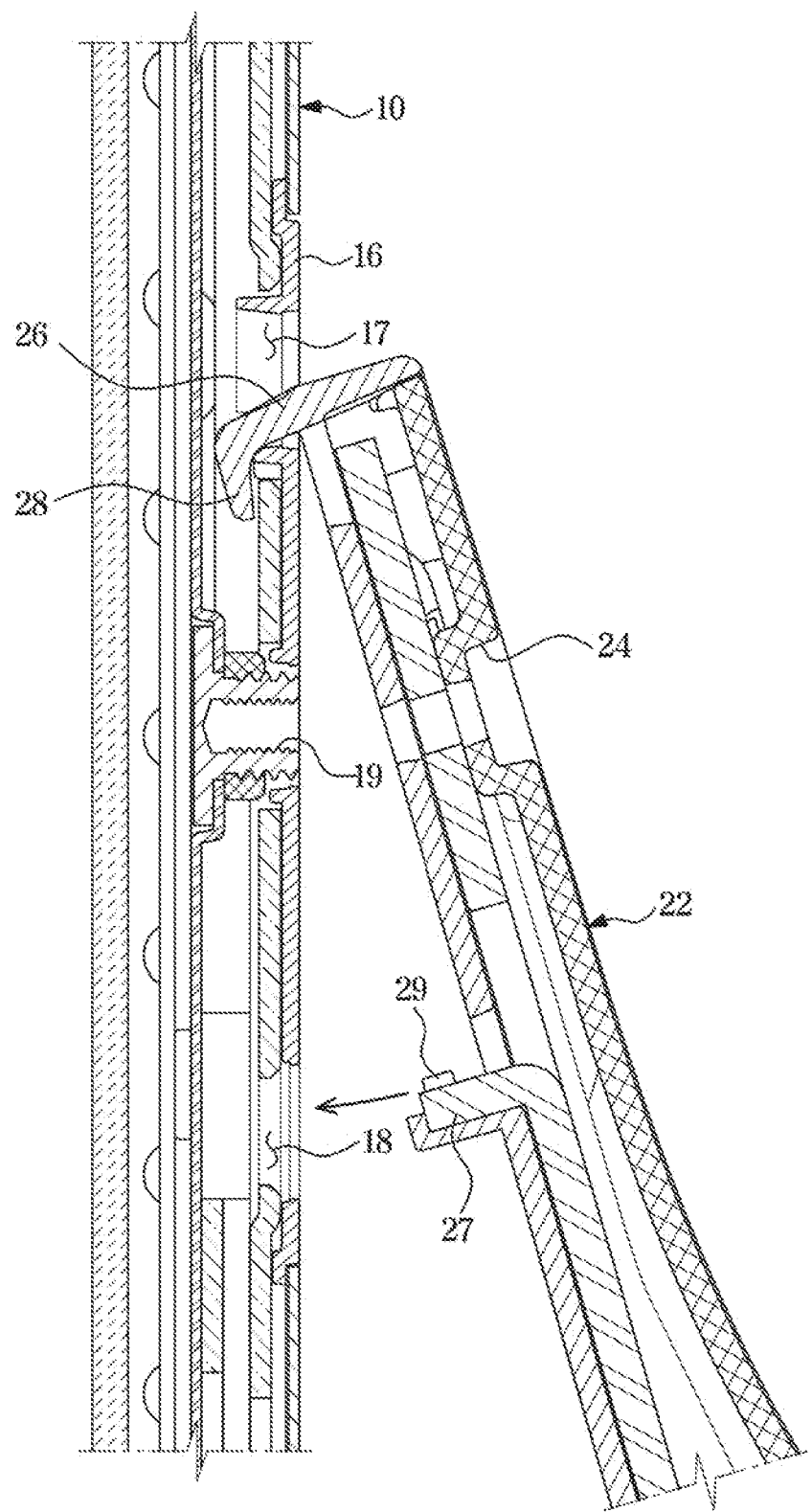
Figure 11:
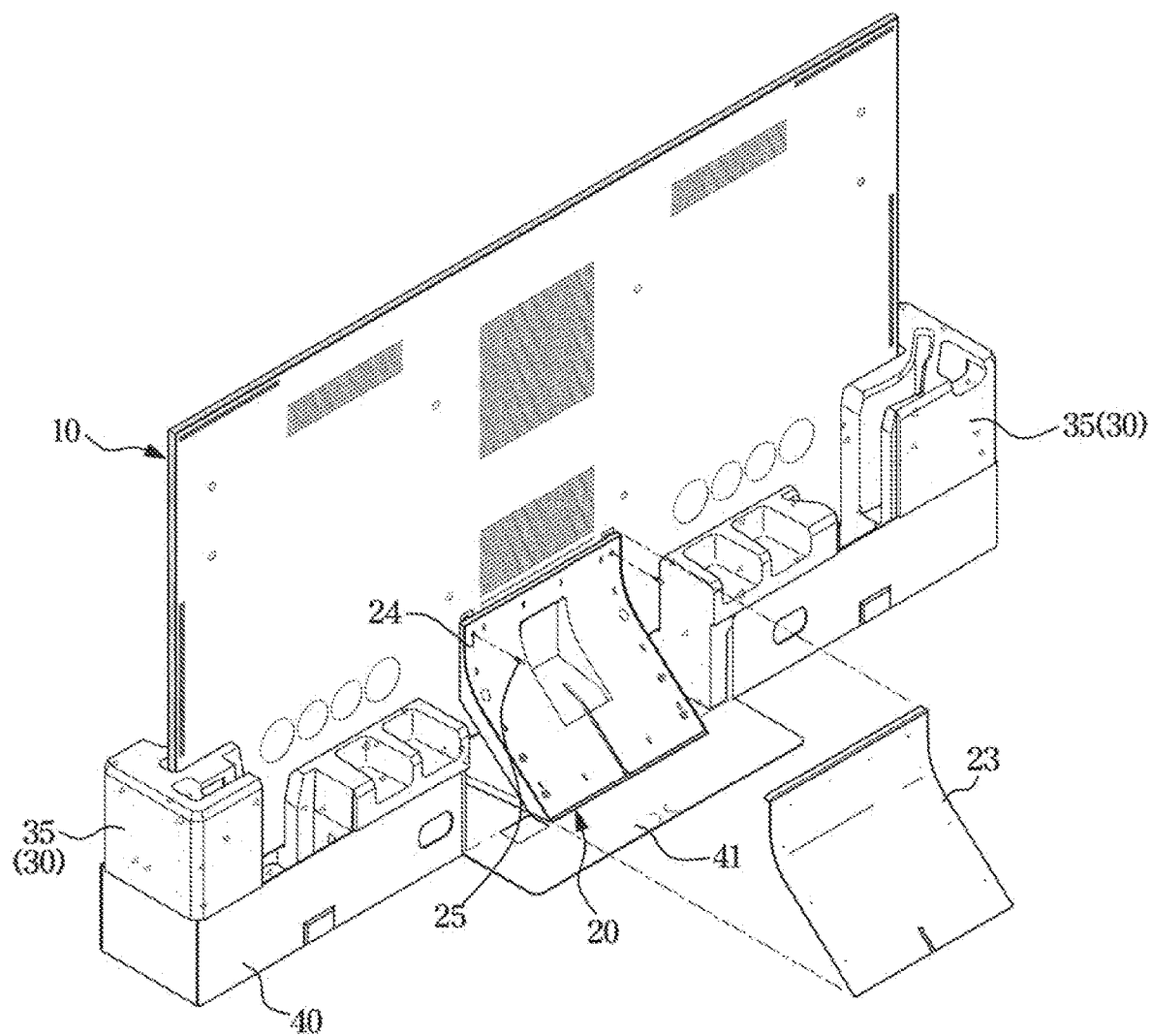
FIG. 11 illustrates that a stand cover is coupled to the stand in a state in which the stand is coupled to the display shown in FIG. 8.
Figure 12:
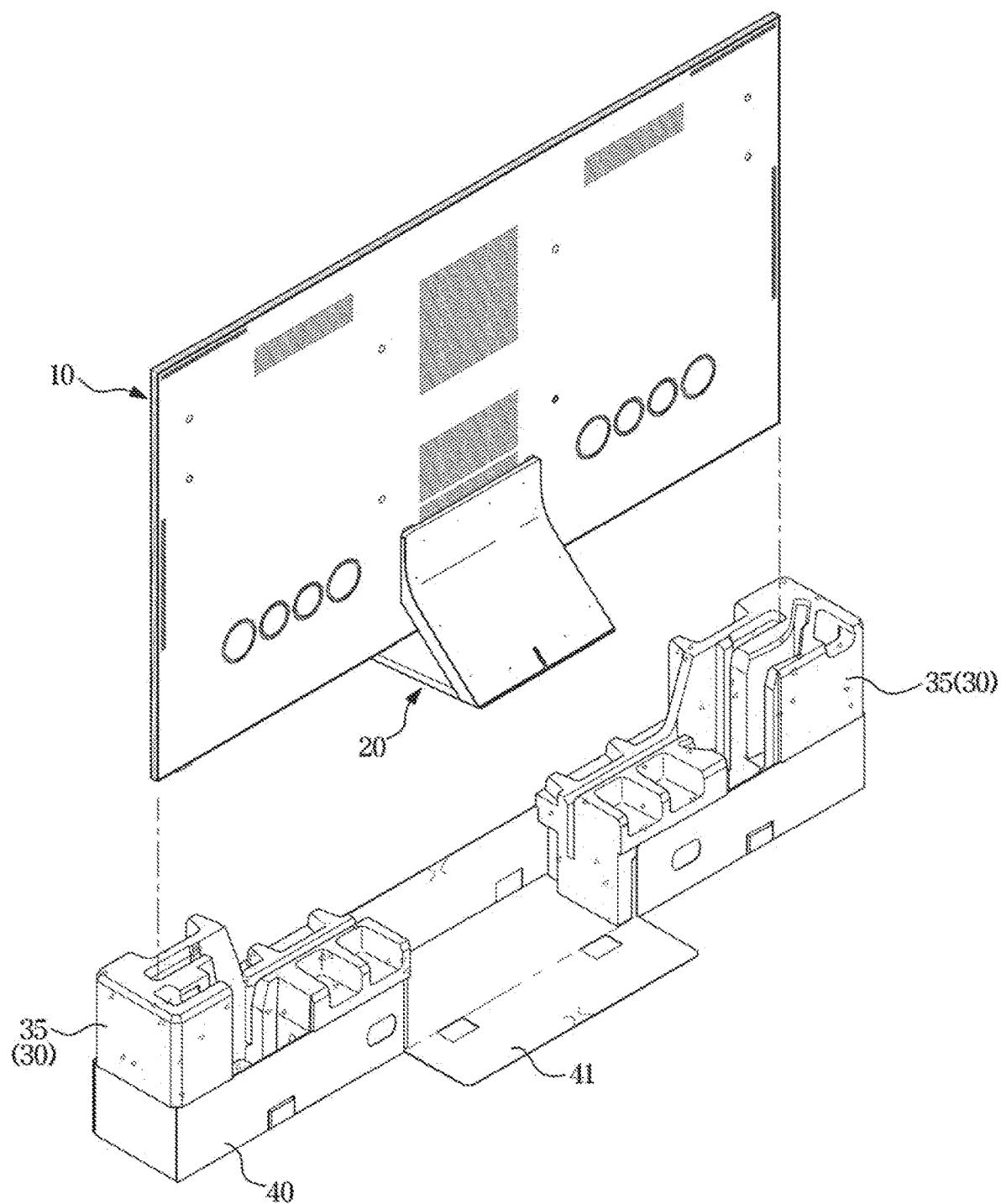
FIG. 12 illustrates that a support protection member is separated from the display to which the stand shown in FIG. 11 is coupled.
Figure 13:
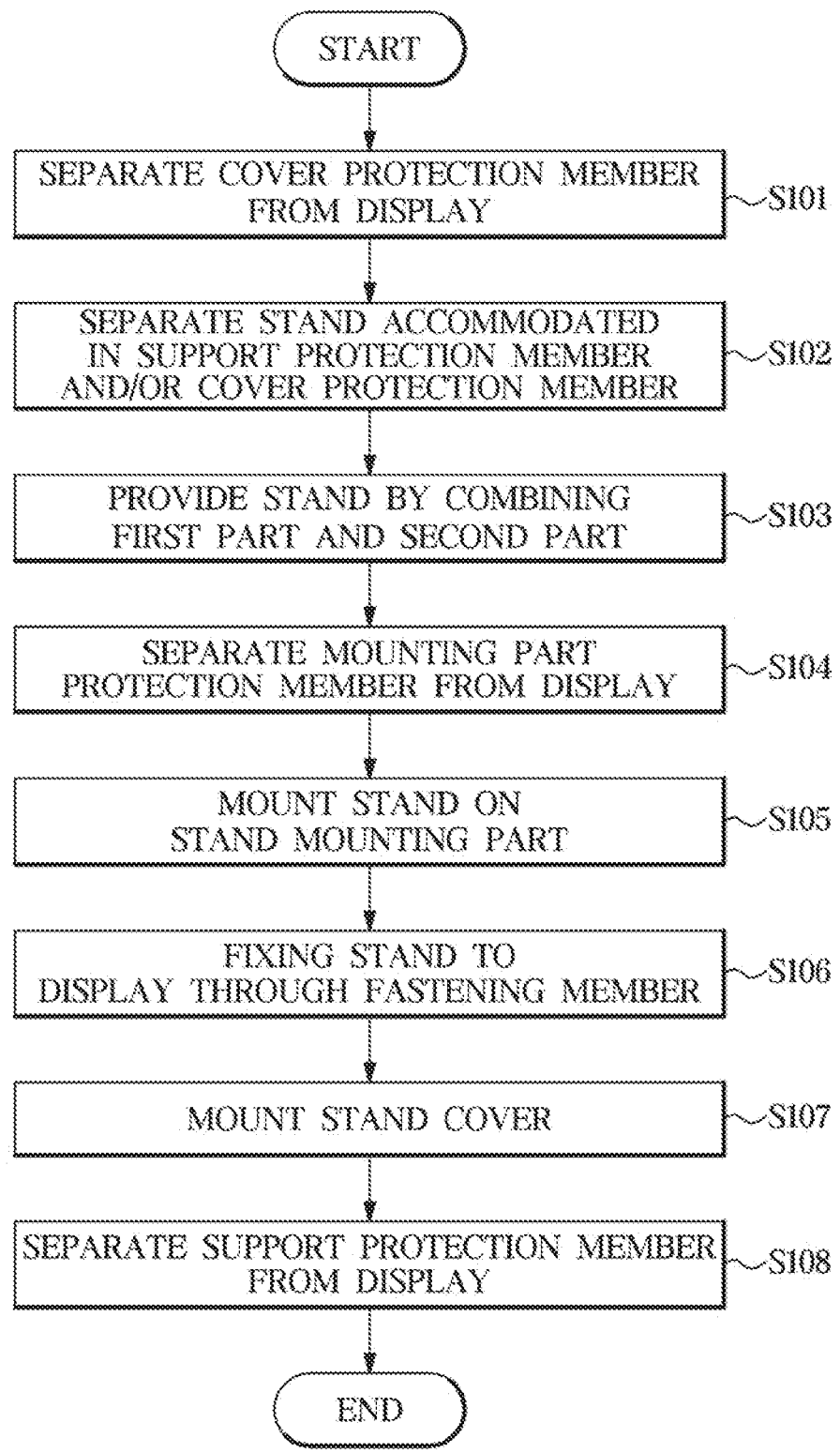
FIG. 13 is a flowchart illustrating a process of assembling the stand of the display apparatus according to an embodiment of the disclosure.

FIG. 5 illustrates that the display and the stand according to an embodiment of the disclosure are covered by a protection member for storage and delivery, FIG. 6 illustrates that a cover protection member and the stand are separated from the display apparatus shown in FIG. 5, FIG. 7 illustrates that a first part and a second part of the stand shown in FIG. 6 are assembled, FIG. 8 illustrates that a mounting part protection member is separated from the display apparatus shown in FIG. 6, FIGS. 9 and 10 are cross-sectional views illustrating a process in which the stand assembled in FIG. 7 is coupled to the display, FIG. 11 illustrates that a stand cover is coupled to the stand in a state in which the stand is coupled to the display shown in FIG. 8, FIG. 12 illustrates that a support protection member is separated from the display to which the stand shown in FIG. 11 is coupled, and FIG. 13 is a flowchart illustrating a process of assembling the stand of the display apparatus according to an embodiment of the disclosure.

Referring to FIGS. 5 and 6, the display apparatus 1 may further include a protection member 30 for storage and delivery. Specifically, the display apparatus 1 may further include the protection member 30 to protect the display 10 during storage and delivery. In the disclosure, the display apparatus 1 may be used to include only the display 10 and the stand 20, and may also be used to include not only the display 10 and the stand 20, but also the protection member 30.

The protection member 30 may be configured to cover at least a portion of the display 10. The protection member 30 may be detachably coupled along an edge of the display 10. At least a portion of the protection member 30 may be covered by a packaging material 40.

The protection member 30 may include a cover protection member 31, a mounting part protection member 33, and a support protection member 35.

The cover protection member 31 may be configured to cover the upper end portion of the display 10. The cover protection member 31 may be configured to accommodate a portion of the stand 20. The cover protection member 31 may accommodate the first part 21 of the stand 20. The cover protection member 31 may be formed to cover the upper end portion of the front surface and the upper end portion of the rear surface of the display 10.

The mounting part protection member 33 may be configured to cover a portion of the lower end portion of the display 10. The mounting part protection member 33 may be configured to cover a portion of the display 10 on which the stand 20 is mounted. The mounting part protection member 33 may be detachably coupled to a portion of the display 10 on which the stand 20 is mounted. The mounting part protection member 33 may be formed to cover a portion of the lower end portion of the rear surface of the display 10. Accordingly, when the mounting part protection member 33 is separated from the display 10, the mounting part protection member 33 may be separated from the display 10 in a state in which the display 10 is not lifted.

The support protection member 35 may be detachably coupled to a portion of the lower end portion of the display 10. The support protection members 35 may be disposed on opposite sides of the mounting part protection member 33, respectively. The support protection member 35 may be configured to cover a lower edge portion of the display 10. The support protection member 35 may be configured to accommodate a portion of the stand 20. The support protection member 35 may accommodate the second part 22 of the stand 20. The support protection member 35 may be formed to cover a portion of the lower end portion of the front surface and a portion of the lower end portion of the rear surface of the display 10.

The support protection member 35 may support the display 10 so that the display 10 is not overturned when the mounting part protection member 33 is separated from the display 10. That is, the support protection member 35 may be configured to stably support the display 10 even when the mounting part protection member 33 is separated from the display 10.

That is, in the display apparatus 1 according to an embodiment of the disclosure, because the mounting part protection member 33 covering a portion of the display 10 on which the stand 20 is mounted is provided separately from the support protection member 35, the stand 20 may be assembled in a state in which the display 10 is erected, and thus damage to the display 10 may be prevented by reducing an external force that may be applied to the display 10 when the stand 20 is mounted.

The stand 20 may be accommodated in the protection member 30 before being mounted on the display 10. That is, the stand 20 may be accommodated in the protection member 30 during storage and delivery of the display apparatus 1. Accordingly, the display apparatus 1 according to an embodiment of the disclosure may be stored and delivered in a compact state.

Specifically, the first part 21 of the stand 20 may be accommodated in the cover protection member 31. The second part 22 of the stand 20 may be accommodated in the support protection member 35. Alternatively, the first part 21 may be accommodated in the support protection member 35, and the second part 22 may be accommodated in the cover protection member 31. Alternatively, both the first part 21 and the second part 22 may be accommodated in the cover protection member 31, or both the first part 21 and the second part 22 are accommodated in the support protection member 35. Alternatively, the first part 21 and the second part 22 may be accommodated in the mounting part protection member 33.

Hereinafter, a method of assembling the display apparatus 1 according to an embodiment of the disclosure will be described with reference to FIGS. 5 to 13.

Referring to FIGS. 5 and 13, the display apparatus 1 including the display 10 covered by the protection member 30 and the stand 20 accommodated in the protection member 30 is provided for storage and delivery.

Referring to FIGS. 6 and 13, first, the cover protection member 31 covering the upper end portion of the display 10 may be separated from the display 10 (S101).

The cover protection member 31 may be separated from the display 10, and the first part 21 of the stand 20 accommodated in the cover protection member 31 and the second part of the stand 20 accommodated in the support protection member 35 may be separated (S102).

Referring to FIGS. 7 and 13, the stand 20 may be provided by combining the first part 21 and the second part 22 separated from the protection member 30 (S103). Specifically, the first part 21 may include a support portion 21a extending in substantially the same direction as the second part 22, and the support portion 21a may be fixed by being inserted into the second part 22. The support portion 21a of the first part 21 may be additionally fixed by a fastening member (not shown) after being inserted into the second part 22.

Referring to FIGS. 8 and 13, in order to expose a portion of the display 10 on which the stand 20 is mounted so that the stand 20 may be coupled to the stand mounting part 16 provided on the display 10, the mounting part protection member 33 may be separated from the display 10 (S104). In order to separate the mounting part protection member 33 from the display 10, a cutting portion 41 of the packaging material 40 may be opened. The cutting portion 41 may be formed to correspond to the mounting part protection member 33. Because the mounting part protection member 33 is formed to cover only a portion of the lower end portion of the rear surface of the display 10, the mounting part protection member 33 may be easily separated from the display 10 in a state in which the display 10 is not lifted.

Next, referring to FIGS. 9, 10 and 13, the assembled stand 20 may be mounted on the stand mounting part 16 of the display 10 (S105).

Specifically, as shown in FIG. 10, the locking part 26 may be first inserted into the first mounting portion 17 by tilting the stand 20 with respect to the display 10. After the locking part 26 may be inserted into the first mounting portion 17, the stand 20 is rotated clockwise so that the separation preventing part 27 may be inserted into the second mounting portion 18.

As the stand 20 is assembled to the display 10 in the above method, the display 10 may be stably held on the stand 20.

Next, referring to FIGS. 11 and 13, the fastening member 25 may be coupled to the stand fastening portion 24 of the stand 20 and the display fastening portion 19 of the display 10 to fix the stand 20 to the display 10 (S106). Next, the stand cover 23 may be coupled to the stand 20 so that the fastening member 25 is not exposed to the outside (S107).

Next, referring to FIGS. 12 and 13, the support protection member 35 may be separated from the display 10 on which the stand 20 and the stand cover 23 are mounted (S108). The display apparatus 1 separated from the support protection member 35 may be moved to and disposed at a position desired by a user.

By assembling the display apparatus 1 according to the above method, in the display apparatus 1 according to an embodiment of the disclosure, the stand 20 may be mounted in a state in which the display 10 is erected, so that damage to the display 10 due to an external force may be prevented.

As is apparent from the above, according to an assembly method of a display apparatus of the disclosure, a stand can be assembled in a state in which a display is erected, so that damage to the display can be prevented by reducing an external force applied to the display when the stand is mounted on the display.

Further, according to the display apparatus of the disclosure, the stand includes a separation preventing part, so that the display mounted on the stand can be prevented from being overturned.

While the disclosure has been particularly described with reference to exemplary embodiments, it should be understood by those of skilled in the art that various changes in form and details may be made without departing from the spirit and scope of the disclosure.

What is claimed is:

1. A display apparatus comprising:
   a display;
   a stand including:
      a first part that is contactable with a support surface, and that includes a support portion, and
      a second part having
         one end that is coupleable to the first part to thereby combine the first part and the second part together, and that is separable from the first part to thereby separate the first part and the second part, and
         another end that is fixable to a back of the display to thereby fix the second part to the display, and that is separable from the back of the display to thereby separate the display and the second part,
         so that, when the first part is in contact with the support surface, the one end of the second part is coupled to the first part, and the other end of the second part is fixed to the back of the display,
         the second part has an inclined portion that is arranged obliquely with respect to the back of the display, and
         the support portion of the first part is inserted into the inclined portion of the second part and extends in a same direction as the inclined portion of the second part,
         so that the display is thereby mounted on the stand and is supported by the stand on the support surface;
   a protection member configured to cover at least a portion of the display; and
   a packaging material covering at least a portion of an external surface of the protection member, wherein the protection member comprises:
a portion that includes a support protection member and is configured to be detachably coupleable along an edge of the display so that, when the portion is coupled along the edge of the display, the support protection member covers a lower end portion of the display,
a mounting part protection member that includes a back portion and a lip portion extending from the back portion, the mounting part protection member configured to be detachably coupleable to the display so that, when the mounting part protection member is coupled to the display, the back portion covers a portion of the back of the display along which the stand is mountable and the lip portion extends under the display, and
a cover protection member configured to cover an upper end portion of the display,
wherein the packaging material includes a cutting portion formed at a rear of the display in a position and size corresponding to the position and size of the mounting part protection member, the cutting portion being openable to provide an opening in the packaging material through which the mounting part protection member is moveable in a direction perpendicular to a front face of the display,
wherein the mounting part protection member, the portion that includes the support protection member, and the cutting portion are further configured so that the mounting part protection member is separately detachable from the display by, with the cutting portion being opened to provide the opening in the packaging material, moving the mounting part protection member in the direction perpendicular to the front face of the display through the opening in the packaging material without moving the mounting part protection member in any other direction, while the portion that includes the support protection member remains coupled along the edge of the display with the support protection member covering the lower end portion of the display, to thereby uncover the portion of the back of the display along which the stand is mountable, and wherein the mounting part protection member is further configured to remain intact after being detached from the display, wherein the cover protection member includes a first accommodating portion configured to accommodate the first part when the first part and the second part are separated, and wherein the support protection member includes a second accommodation portion configured to accommodate the second part when the first part and the second part are separated.

2. The display apparatus according to claim 1, wherein, when the mounting part protection member is detached from the display while the portion that includes the support protection member remains coupled along the edge of the display with the support protection member covering the lower end portion of the display, the support protection member is configured to support the display to prevent the display from being overturned.

3. The display apparatus according to claim 1, wherein the support protection member includes first and second support protection members disposed on opposite sides of the mounting part protection member, respectively.

\* \* \* \* \*